US012024187B2

(12) United States Patent
Kalita et al.

(10) Patent No.: US 12,024,187 B2
(45) Date of Patent: Jul. 2, 2024

(54) SYSTEM FOR DETECTING, LOCALIZING, AND SHARING POTHOLES

(71) Applicant: Volvo Truck Corporation, Gothenburg (SE)

(72) Inventors: Prabandhana Kalita, Bangalore (IN); Kamal Kolla, Bangalore (IN); Anandhu Krishna, Kollam Kerala (IN)

(73) Assignee: Volvo Truck Corporation, Gothenburg (SE)

( * ) Notice: Subject to any disclaimer, the term of this patent is extended or adjusted under 35 U.S.C. 154(b) by 100 days.

(21) Appl. No.: 17/939,051

(22) Filed: Sep. 7, 2022

(65) Prior Publication Data

US 2023/0108406 A1 Apr. 6, 2023

(30) Foreign Application Priority Data

Sep. 30, 2021 (EP) .................................... 21200174

(51) Int. Cl.
*B60W 50/14* (2020.01)
*B60W 40/06* (2012.01)
*G01S 7/292* (2006.01)
*G01S 13/86* (2006.01)
(Continued)

(52) U.S. Cl.
CPC ............ *B60W 50/14* (2013.01); *B60W 40/06* (2013.01); *G01S 7/292* (2013.01); *G01S 13/86* (2013.01); *G01S 13/90* (2013.01); *G01S 13/931* (2013.01); *B60W 2050/146* (2013.01); *B60W 2420/408* (2024.01); *B60W 2552/35* (2020.02); *B60W 2556/45* (2020.02)

(58) Field of Classification Search
CPC ................ B60W 50/14; B60W 40/06; B60W 2050/146; B60W 2552/35; B60W 2556/45; G01S 7/292; G01S 13/86; G01S 13/90; G01S 13/931
See application file for complete search history.

(56) References Cited

U.S. PATENT DOCUMENTS

| | | | | |
|---|---|---|---|---|
| 9,416,499 | B2 * | 8/2016 | Cronin | .................... E01C 23/06 |
| 9,626,763 | B1 * | 4/2017 | Hoye | ....................... B60R 11/04 |
| 10,235,770 | B2 * | 3/2019 | Hoye | ........................ G06T 7/70 |

(Continued)

OTHER PUBLICATIONS

Extended European Search Report for European Patent Application No. 21200174.7, mailed Mar. 22, 2022, 10 pages.

*Primary Examiner* — John A Tweel, Jr.
(74) *Attorney, Agent, or Firm* — Withrow & Terranova, PLLC

(57) ABSTRACT

A method for detecting, localizing, reporting, and displaying potholes on a road, in a system comprising a sensing device mounted on a vehicle, a cartography display, and a control unit, the sensing device comprising at least a radar device, the method comprising scanning with the sensing device an area of interest in front of and ahead the vehicle, the area of interest including at least a surface of a road traveled by the vehicle, the sensing device outputting a data flow; identifying first candidate potholes formed on the road surface; further processing the data flow to find out first confirmed potholes among the first candidates potholes; allocating a geolocation to each of the first confirmed potholes; and displaying, on the cartography display, first potholes with their localization superimposed on the map.

16 Claims, 5 Drawing Sheets

(51) Int. Cl.
*G01S 13/90* (2006.01)
*G01S 13/931* (2020.01)

(56) References Cited

U.S. PATENT DOCUMENTS

| | | | |
|---|---|---|---|
| 11,015,944 B2 * | 5/2021 | Lei | G01C 21/3617 |
| 11,073,401 B1 * | 7/2021 | Blanc-Paques | G01C 21/3852 |
| 11,285,840 B2 * | 3/2022 | Whitt | G07C 5/004 |
| 11,380,147 B2 * | 7/2022 | Diehl | B60W 50/023 |
| 2014/0168001 A1 | 6/2014 | Agnew | |
| 2020/0254995 A1 | 8/2020 | Lee | |
| 2020/0269877 A1 | 8/2020 | Mortazavi et al. | |

* cited by examiner

SYSTEM FOR DETECTING, LOCALIZING, AND SHARING POTHOLES

RELATED APPLICATIONS

The present application claims priority to European Patent Application No. 21200174.7, filed on Sep. 30, 2021, and entitled "SYSTEM FOR DETECTING, LOCALIZING, AND SHARING POTHOLES," which is incorporated herein by reference in its entirety.

FIELD OF THE DISCLOSURE

Quality of road surface and structure is a key factor with regard to road transport efficiency and safety. Also quality of track surface and structure is a key factor with regard to off-road transport efficiency, like in the mining industry, or within other private or semi-private premises.

BACKGROUND OF THE DISCLOSURE

Poor quality of the road surface or track surface can cause important damages to vehicles and even render the travel dangerous. Especially trucks control and drivability are negatively affected by the presence of potholes or the like on the track/road surface. Some conditions worsen the situation, for example when the trucks are travelling at night, and generally during times of low visibility. Another adverse configuration prevails when potholes are filled with water or mud. Under such conditions, the truck driver cannot really see the potholes or the damaged part of the road/track. Further, drivers cannot see the depth of the potholes ahead enough.

Therefore, there remains a need to improve the situation.

SUMMARY OF THE DISCLOSURE

According to one aspect of the present disclosure, it is disclosed a method for at least detecting, localizing, and reporting (showing/displaying) potholes (9) on a road, where the method is being carried out in a system comprising a sensing device (4) mounted on a vehicle (V), a cartography display mounted on the vehicle, and an onboard control unit (6) aboard the vehicle, the sensing device comprising at least a radar device,
the method comprising:
  a—scanning with the sensing device an area of interest in front of and ahead the vehicle, the area of interest including at least a surface of a road traveled by the vehicle, the sensing device outputting a data flow,
  b1—identifying, in the data flow, first candidate potholes formed on the road surface, where candidate potholes correspond to predetermined echoes, where a pothole creates an echo different from an echo of an even road surface,
  b2—further processing the data flow to find out first confirmed potholes among the first candidates potholes, by tracking first candidate potholes following vehicle motion,
  c—allocating a geolocation to each of the first confirmed potholes,
  d—displaying, on the cartography display, first confirmed potholes with their localization superimposed on the map.

Thanks to this disposition, we improve detection, beyond human sight; that is to say detection is performed efficiently at night and/or at times of low visibility, whereas human sight cannot do so. Also, the promoted solution improves safety in non-illuminated tunnels.

Here the term "pothole" should be construed broadly, namely there is no limitation about the size and conformation of potholes, it can be a continuous area of uneven and damaged road portion.

The clause "reporting potholes" is to be understood as reporting potholes information to a truck driver. This can be done in a graphical manner, in such case reporting means showing and/or displaying reporting potholes on a navigation map. It is not excluded though to do such a report by audio guidance, instead or in addition to the graphical display.

According to one aspect, the tracking of first candidate potholes following vehicle motion is made via a SLAM algorithm where SLAM stands for Simultaneous localization and mapping. A long as the vehicle gradually moves forward, the onboard computer knows recurrently and in real time, by odometry and/or geolocation difference, the small position increments travelled by the vehicle and for each scanned point, the new echo is registered on the previous echo received from the same geolocation, by compensation for the small position increment of the sensing device.

According to one aspect, the tracking of first candidate potholes following vehicle motion is made via an ICP algorithm where ICP stands for Iterative Closest Point. Iteratively, the newly received echo of a candidate pothole is registered on the previous ones, thanks to the ICP algorithm, the algorithm converges when the smallest difference is reached. The ICP algorithm is applied for each newly received echo of a candidate pothole, which helps confirming that candidate pothole becomes a confirmed pothole.

According to one aspect, the radar device may be preferably a SAR-type radar, namely synthetic aperture radar device.

SAR-type radar takes advantages of phase detection. Detection is improved from vehicle motion, same point is gradually illuminated from different directions, which improves the perception even with a small surface antenna.

According to one aspect, it is contemplated that at step b2—, first candidates potholes are extracted from the data flow, and a likelihood of a confirmed pothole is assessed with subsequent radar scans, and such pothole thereby confirmed being selected as a first confirmed pothole. Advantageously, tracking first candidate potholes following vehicle motion like with SLAM/ICP algorithm helps determining and confirming a real pothole, it also helps discarding an object lying on the road like a leaf or leaves. SLAM stands for Simultaneous localization and mapping, ICP is exemplifier later in the application.

According to one aspect, it is contemplated that a first candidate pothole is determined as a local recess in the road surface, namely a local recess with regard to a higher neighboring border.

According to one aspect, the proposed method may comprise:
  b3—characterizing each of the first confirmed potholes by a set of size characteristics, comprising at least one of: its depth (9D), its width (9W), its length (9L).

We thereby provide knowledge of the geometry of each pothole, in particular its depth.

According to one aspect, the proposed method may comprise:
  allocating a severity rating to each of the first confirmed potholes, possibly at least as a function of its depth (9D).

Ranking of first confirmed potholes provides is beneficial, it denotes hierarchy about danger level of all potholes.

According to one aspect, the proposed method may comprise:

sharing (making available) first confirmed potholes and associated geolocation, preferably with its size characteristics, to a third party i.e. remote server(s) and/or to neighboring vehicle(s) via Car2Car communication.

This can help informing other users, cars or trucks that will use this road short-term or medium-term.

According to one aspect, the proposed method may comprise:

receiving second potholes data from a remote database or a local database.

Truck drivers can take advantage of other users knowledge about potholes, to choose the more relevant path and to know well in advance the possible danger(s) created by pothole.

According to one aspect, the proposed method may comprise:

d2—displaying, on the cartography display, second potholes.

The displayed map can show potholes ahead, beyond the range of the onboard radar device.

The present disclosure is also directed to a system configured to carry out the method exposed above.

According to a further aspect, the promoted system displays on the one hand potholes directly determined in real-time fashion via the onboard sensing device (so-called 'first' potholes), and on the other hand, known potholes determined beforehand by the concerned vehicle or by other vehicles (so-called 'second' potholes).

According to a further aspect, the second potholes are retrieved from a local database, and if a wireless or cellular communication is available, the second potholes are retrieved from a remote database.

According to one aspect, the proposed method may comprise:

d3—displaying, on the cartography display, with various icons and/or colors, each of the first and second potholes together with their respective severity rating.

This provides intuitive and comprehensive display for the truck driver.

According to one aspect, the sensing device comprises, besides the radar device, a lidar device and/or a ToF camera, ToF camera standing for Time Of Flight camera.

This provides complementary information besides radar scans results. This improves pothole determination and distinction from other type of similar echoes. This avoids false positives.

According to one aspect, the proposed method may comprise:

b10—identifying in the data flow generally damaged/uneven portions on the road surface.

Thereby, we show, besides classic potholes, there may be damaged portions of the road not looking like conventional potholes but also greatly detrimental to the truck travel.

According to one aspect, the area of interest encompasses the whole width of the road/track.

We thereby gather information about the whole road width, and we share information with trucks travelling opposite direction.

According to one aspect, the proposed method may comprise:

d2—displaying, on the cartography display, one or more itinerary to go from a departure location (A) to a destination location (B), each of the one or more itinerary being displayed together with a respective cumulated pothole severity rating.

Advantageously, this allows the truck driver to decide which itinerary is best for the travel to carry out.

Besides, the present disclosure is also directed to a system an imaging device mounted on a vehicle, a cartography display mounted on the vehicle, and an onboard control unit aboard the vehicle, configured to carry out the method as exposed above.

According to one aspect, the system may further comprise a remote server and a data link allowing data exchange between the remote server and the onboard control unit.

According to one aspect, the sensing device comprises, besides the radar device, an inertial measurement unit (IMU).

This provides complementary information besides radar scans results. In case the potholes are filled with water and/or light mud which could hinder proper estimation of its dimension and/or fail to detect it resulting in truck falling in a pothole. The IMU data can be used to provide a warning message to an upcoming truck in same path.

BRIEF DESCRIPTION OF THE DRAWINGS

Other features and advantages of the invention appear from the following detailed description of two of its embodiments, given by way of non-limiting example, and with reference to the accompanying drawings, in which.

DETAILED DESCRIPTION OF THE DISCLOSURE

In the figures, the same references denote identical or similar elements. For sake of clarity, various elements may not be represented at scale.

General Context

Figure 1:
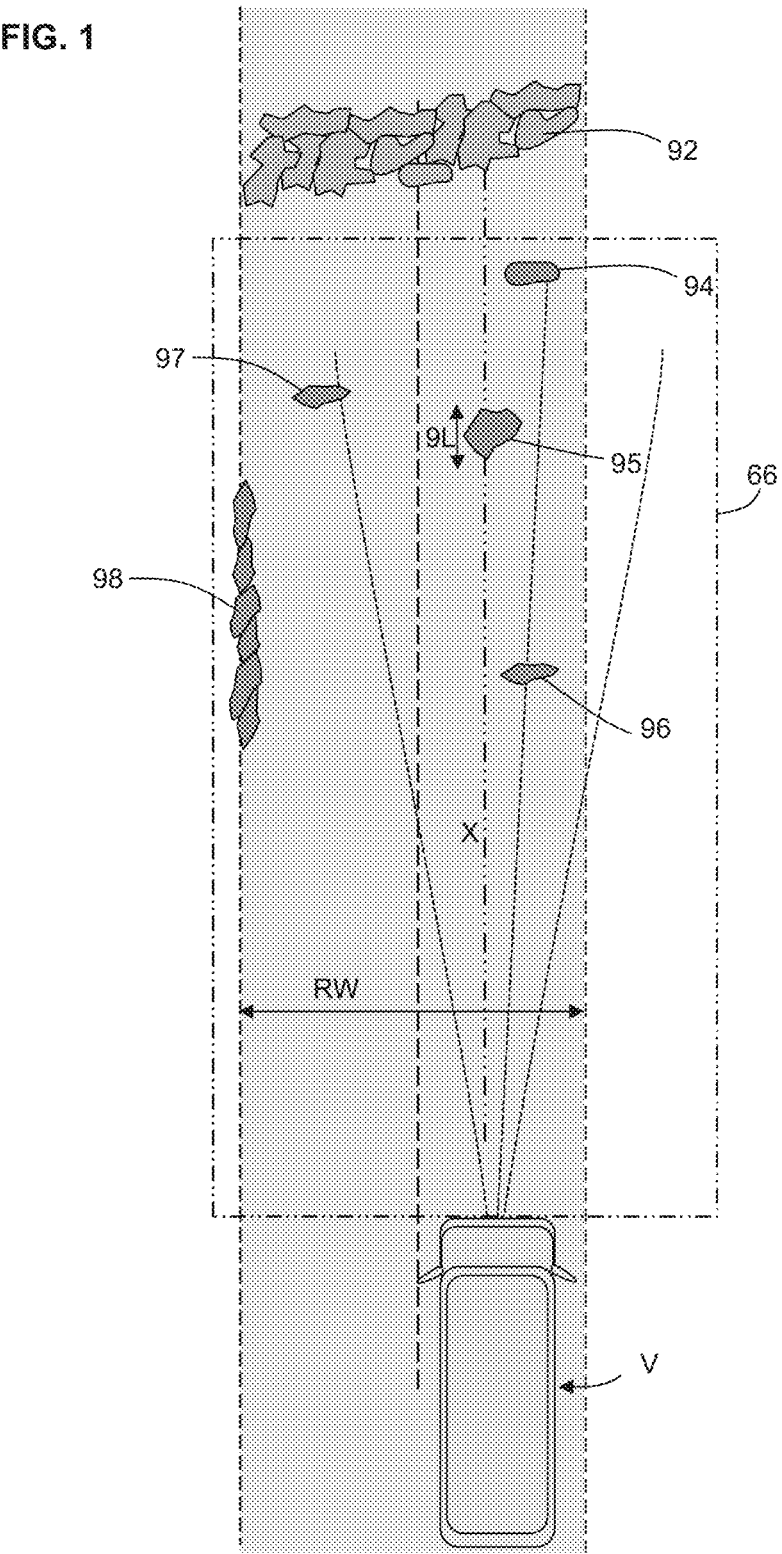
FIG. 1 illustrates a diagrammatical top view of one or more vehicle(s) circulating on a road.

FIG. 1 shows diagrammatically a top view of a road where one vehicle V is moving. The present disclosure relates to dealing with poor road surface quality. Also of particular interest here are structurally damaged portions of road infrastructure at the center or at the borders of the road.

There are shown various examples of potholes in FIG. 1. There can be individual potholes 94, 95, 96, 97. There also can be of potholes formed as continuous area 92 of uneven and damaged road portion. Such continuous area of uneven and damaged road portion can concern a border 98 of the road.

In the present disclosure potholes are generically denoted by reference 9.

Potholes can be located in road lane that is to be travelled by the vehicle. Potholes can also be located in another road lane, where vehicle(s) travel in the same direction, or where vehicles can travel in opposite direction. The general longitudinal motion direction of the vehicle V is denoted X. We note here that axis X is generally not horizontal. First of all, the inclination of the road can result in a longitudinal axis oriented upwards or downwards. Secondly given the suspension of the vehicle, the orientation of longitudinal axis is not necessarily parallel to the road surface, there are swing oscillations (pitch and roll). In addition, beside dynamic behaviour, the vehicle can exhibit a pitch-up posture or a pitch-down posture, notably according to carried payload.

The present disclosure considers trucks of all types, including off-road transport. The truck considered here can be the tractor unit in a tractor/trailer configuration or it can be a utility 'carrier' truck. Of particular interest here we also consider off road trucks like the ones used in the mining industry. We consider here not only vehicles/truck circulating on public roads but also vehicles/truck circulating elsewhere like in private premises or semi-private premises. We consider here vehicles/truck used in mining resorts.

Consequently, the term 'road' is to be construed broadly including track, paths or the like. The borders of such track/road may be clearly identified in some cases, but also in other cases the borders cannot be clearly identified. Stated otherwise, the lateral shoulders may be of any structure.

We define an area of interest 66. Said area of interest 66 is located in front of and ahead the vehicle of interest. The area of interest 66 includes at least a surface of a road to be traveled by the vehicle. The area of interest is 3D, i.e. a volume of interest. Generally the area of interest encompasses the whole width RW of the road (see FIG. 1).

Figure 2:
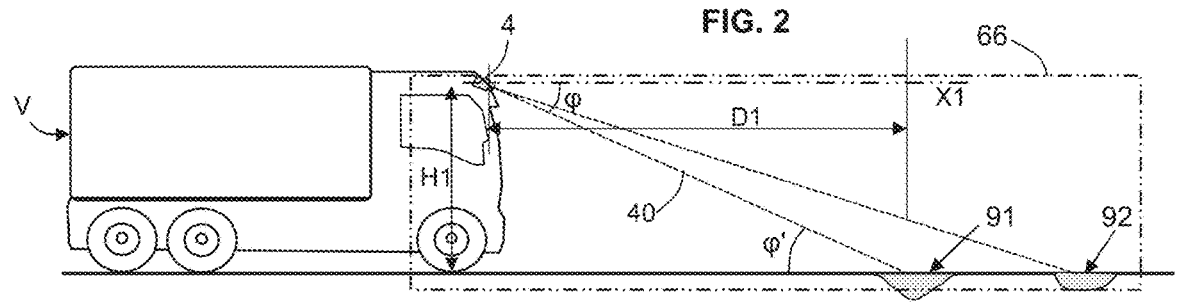
FIG. 2 illustrates a diagrammatical elevation view of the vehicle of interest circulating on a road.

The height of the volume of interest is slightly greater than a height H1 where the sensing device (to be discussed later) is arranged on the vehicle. H1 is taken with the ground as reference as shown at FIG. 2.

In the vertical dimension the area of interest encompasses the road surface and beneath.

More details will be discussed later about the area of interest 66.

The forward velocity of the vehicle denoted VSP.

Geolocation Means and Cartography

Besides the imaging unit, the vehicle V comprises a geolocation system receiver, configured to receive signals from satellites 75 and to deliver therefrom a plurality of successive geolocations GPS(i), the index i denotes the rank in the series of successive geolocations.

Vehicle speed VSP can be obtained from the wheel speed of the wheels or from the derivative of the successive geolocations GPS(i), or both.

Geolocations systems of this type are known per se, such as GPS, Galileo, Glonass or the like, and therefore not described in detail herein.

Also, it is contemplated to use RTK GPS or differential GPS.

According to the expected dynamic behavior of the vehicle, it is contemplated to use a low-pass filter to discard jitter from the raw signals.

The electronic control unit 6 (to be discussed later) can determine from geolocation signals the current geolocation of the vehicle.

Regarding now cartography, there may be provided a local cartography map, as known per se. Further regarding cartography, there may be provided a remote cartography map, downloaded upon request and desired geolocations as also known per se. Hybrid configurations are also considered, where basic map can be present in a local cartography map, whereas complementary maps and/or traffic real-time information are downloaded on need from one or more remote servers.

In any case, cartography information can comprise the type of each road or track segment (width, number of lane(s) one/two ways, flat/uphill/downhill, material of pavement, type of shoulder, . . . )

The map is displayed on a cartography display 7 provided for the vehicle driver.

Further regarding geolocation, in addition to GPS or the like, a dead reckoning function can be provided. Integration of speed and steering angle is one possible solution.

Recourse to an inertial platform (IMU) with simple/double integration of basic speed/acceleration can also be considered. When SLAM process is not possible (bad weather condition or dark conditions), the inertial Measurement Unit can provide precise localization of the vehicle on the road, and position of potholes can be displayed to the truck driver with a good accuracy.

Sensing Device/Radar-Type Unit

There is provided on the vehicle a sensing device 4. The sensing device is preferably installed at the uppermost possible position looking ahead, for example shown in the FIGS. 2 and 3, at the top of the front face of the cabin.

H1 denoted the height position of the sensing device with regard to the ground reference. H1 is typically comprised between 200 cm and 300 cm, preferably comprised between 220 cm and 260 cm. It should be noted that a sensing device at this height H1 is not prone to splashing. By contrast, in other known systems, sensors located under the vehicle chassis or at the shock absorbers are bound to be dirtied quickly by splashing of mud.

Preferably, the promoted system here is deprived of sensor(s) below a 1 meter threshold from the ground level.

Figure 5:
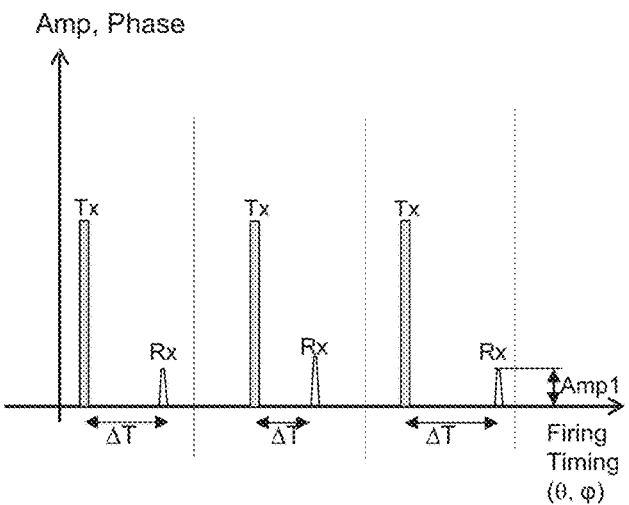
FIG. 5 is a chart illustrating the frame collection basic process by a radar scanner unit.

The sensing device comprises at least a radar device, i.e. a radar-type scanner, simply 'radar' in short. The radar 51 uses bursts of electromagnetic waves Tx and echoes Rx coming back from objects present in the scene. As known per se, of FIG. 5, time difference ΔT between transmitting burst instant and backscatter echo reception is proportional to the distance separating the radar from the surface of an object were the electromagnetic waves have bounced back. Unlike some other detection system, radar device operation is not impaired by darkness, and is not impaired by light rain of light fog.

Either a time difference or an equivalent frequency deviation (FMCW Chirp radar variant) is measured to infer the distance.

Also the amplitude Amp and phase of each echo is recorded. The amplitude and phase of the echoes Rx depend on the nature of the object that backscatters the impinging electromagnetic waves Tx. It is understood that a pothole creates an echo different from an even road surface. Also a pothole filled with water or mud creates a further different echo from an even road surface or a void pothole.

The electromagnetic waves used for radar unit 51 have a carrier frequency comprised between 10 MHz and 100 GHz. In one embodiment, the radar 51 is a 77 GHz radar scanner. In one embodiment, the radar unit 51 is a 24 GHz radar scanner.

The radar unit 51 exhibits a first field of view expressed in an angular scan sector (θazi, φelev). This field of view encompasses the above mentioned area of interest 66.

Angle θ denotes azimuthal sweep, whereas angle φ denotes vertical sweep.

Given the rather narrow width of the area of interest, the scan of the total angular scan sector (θazi, φelev) takes little time. The frequency of scan repetition is comprised between 20 Hz and 60 Hz, i.e. each point of the field of view is scanned 20 to 60 times per second.

One can say that a complete scan cycle across the field-of-view outputs a point cloud or an image. The successive point clouds or images can be used to build a rolling map, said rolling map being constructed from all the successive images resulting from the scanning process.

Following vehicle motion, and incremental known displacement, the successive images are registered onto the rolling map. This is the Slam process already discussed. A new image is appended to the rolling map after being registered (longitudinal shift to compensate for vehicle forward displacement) to build recurrently a rolling map ahead of the vehicle. In this rolling map, particular echoes matching with predetermined echoes denoting a pothole are tracked.

As shown in FIG. 2. X1 denote the longitudinal axis of the vehicle at the level of the sensing device. Angle φ is the vertical deviation versus X1. Angle φ' denotes the angle of the burst ray 40 versus the ground. Angle φ' may differ from angle φ with respect to suspension or the static posture (pitch up or pitch down). In a particular case shown at FIG. 2, φ'=φ.

Figure 6:
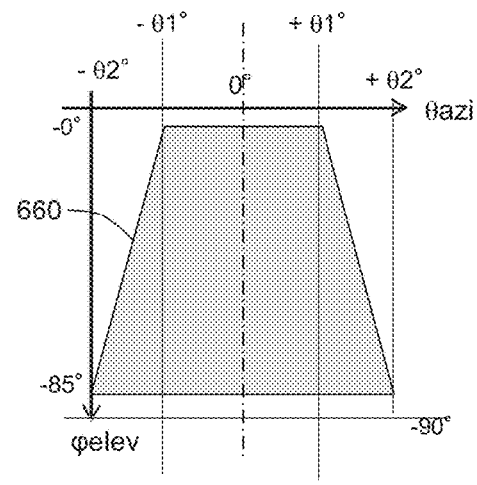
FIG. 6 illustrates an example of aperture angles of the radar frame collection process.

As shown in FIG. 6, the angular scan domain can be trapezoidal. The more pronounced is the lookdown direction, the wider is the azimuthal angular range θ. Conversely, the more horizontal the lidar beam, the narrower is the azimuthal angular range θ. In FIG. 6 φ is shown in the negative range, from a φ=0 aligned with X1.

Figure 3:
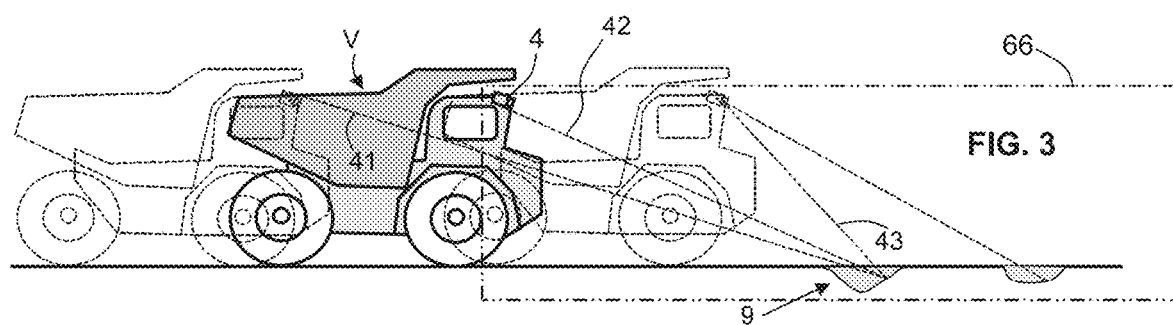
FIG. 3 illustrates another diagrammatical elevation view of another vehicle of interest circulating on a track.

More precisely, azimuthal sweep θ is comprised between −θ2 and θ2 when angle φ corresponds to a max look down attitude. By contrast, azimuthal sweep θ is comprised between −θ1 and θ1 when angle φ corresponds to a look ahead attitude (angle φ=0°). In one embodiment, angle φ scan sector is 85° as shown at FIGS. 3 and 6. In one embodiment, limit angle θ1 is comprised between 10° and 15°, limit angle θ2 is comprised between 20° and 45°.

According to one example, the angular scan domain is symmetrical with regard to the longitudinal axis (left/right symmetry). There may be a proportional link 660 between azimuth and elevation, wherein the total azimuthal range is a function of a elevation (negative), as illustrated at FIG. 6.

According to one option, the angular scan domain can be enlarged on the side of the steering direction, i.e. this means enlarging the area of interest on the turning side.

According to one option, the angular scan domain can be enlarged or biased according the itinerary to be followed. The area of interest can be defined in accordance with the geolocation map (cartography and current position), the area of interest matches with the road curvature ahead.

According to a particular aspect of the present disclosure, the radar device is a SAR-type Radar.

When the vehicle moves, a particular point is scanned several times with a slightly different impinging angle. The successive series of echoes results in a plurality of information with amplitude and phase as already exposed above. Processing of the series of echoes, either at low level in the radar device or at the computing unit 6, allows finding real potholes and shed other echoes and avoiding thereby to record false positives.

Stated otherwise, firstly candidate pothole(s) are gathered from the radar device data flow. Then further processing the data flow helps finding out confirmed potholes among the candidate potholes.

In the present document, potholes retrieved during the above process by the sensing device are called 'first' by contrast with other potholes recorded previously or known from other source device are called 'second'.

The data flow further processing can be performed through digital filters, fast Fourier transform, neural network, etc. . . . .

In addition, vehicle suspension is considered, pitch and roll movement are taken into account. According to one solution, the radar device can be mounted on a stabilization platform with a mechanical low pass filtering that discards all the undesirable vibrations. According to another solution, data obtained from a new radar scan can be 'registered' to the previous one, in other words the scan is realigned with the help of a landmark or with the help of an ICP algorithm (ICP: Iterative Closest Point).

System Overview, Behavior and Functionalities

Figure 4:
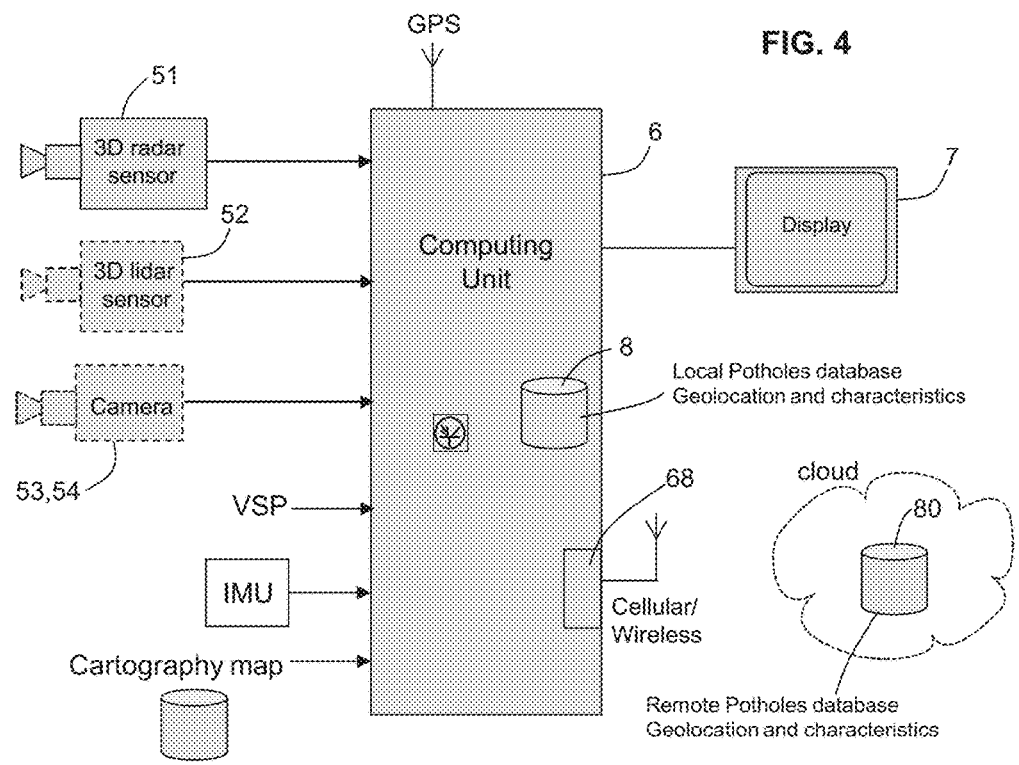
FIG. 4 shows a diagrammatical block diagram of the system promoted in the present disclosure.

As illustrated at FIG. 4, the system comprises the onboard control unit 6, cartography display 7, the radar device 51, a memory or database 8, which can be integrated or not in the onboard control unit 6. Further, the system comprises a wireless/cellular communication means 68. Thanks to the wireless/cellular communication means 68, the control unit 6 is internet enabled and can access a remote or database 80.

Optionally, the system may comprise the lidar device 52.

Optionally, the system may comprise one 3D camera or time-of-flight camera (ToF camera). Alternately, the system may comprise two cameras 53,54 for stereoscopic vision. Lidar and camera(s) can be located at the top of the cabin, but not necessarily at the same location of the radar device. The radar device 51 may be located on the median vertical plane.

Data gathered by the lidar or the camera(s) can be used to complement data gathered by the radar device.

From data flow delivered by the radar device, it is determined first candidate potholes formed on the road surface. Candidate potholes can correspond to predetermined echoes, or series of echoes of the same impinged area with successive radar scans. Predetermined echoes can be stored in lookup tables, reference tables or the like. There also may be provided a learning mechanism.

Figure 9:
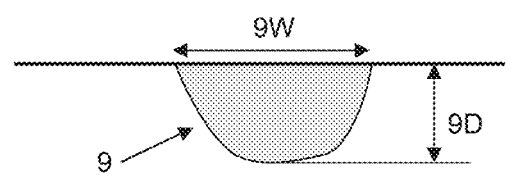
FIG. 9 illustrates an example of a section of a pothole.

Each of the potholes can be characterized by a set of size characteristics, comprising at least one of: its depth 9D, its width 9W, its length 9L. (See FIGS. 1 and 9).

There may be provided a pothole rating according to severity with regard to safety and/or potential damage to vehicle. This consists in allocating a severity rating SR to each of the potholes (notably the first confirmed potholes).

Severity rating can be defined with the help of a severity scale ranging from 1 to 10. According to one example, a shallow recess will be rated 1, a substantial pothole would be rated 5 and a deep pothole would be rated 10.

The severity rating is possibly calculated as a function of its depth 9D.

Other criteria can also be taken into account like the longitudinal length of the pothole or the damaged area. severity rating SR can be expressed as a function of the size characteristics of the considered pothole. Such as SR=f (depth, width, length).

A severity rating can also be allocated to a large damaged area, i.e. an area wider than a single individual pothole.

Figure 7:
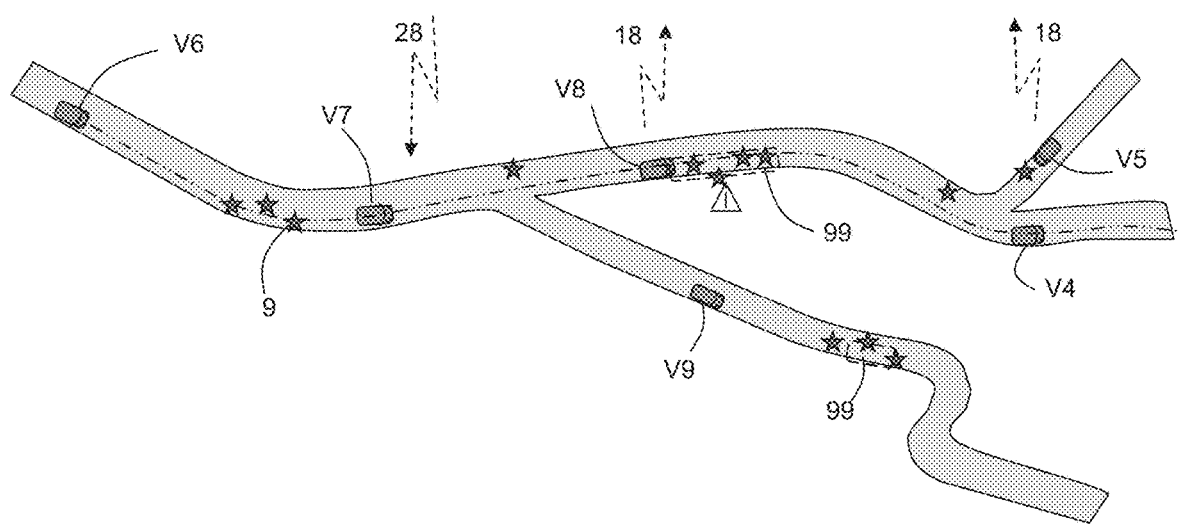
FIG. 7 illustrates an example of a displayed map.
Figure 8:
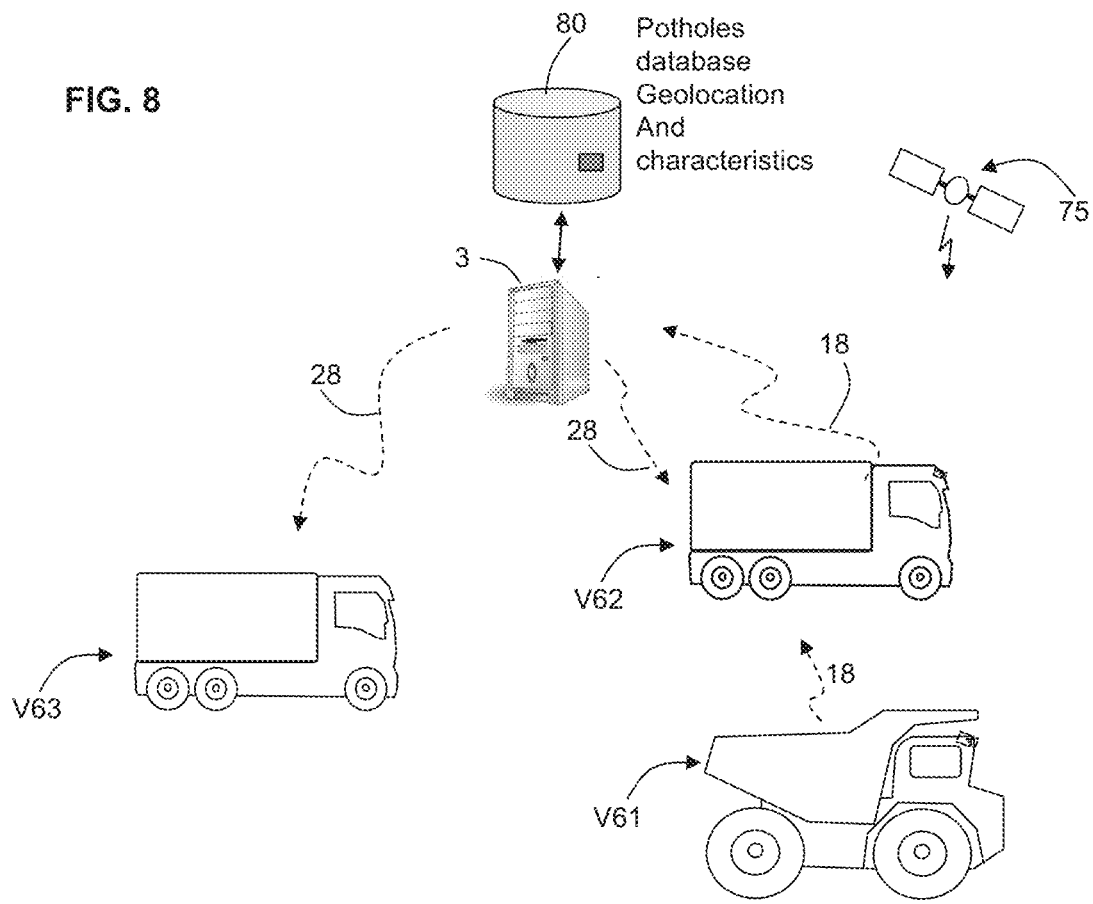
FIG. 8 illustrates a diagrammatical block diagram of the overall system promoted in the present disclosure.

As illustrated in FIGS. 7 and 8, the knowledge of potholes can be shared between various road users.

Indeed the proposed method includes sharing pothole information with other parties. This means making available first confirmed potholes and associated geolocation, preferably with its size characteristics, to a third party. Such third party can be a remote server 3. Such third party can be one or more neighboring vehicle(s) via Car2Car communication.

In practice there is provided an uplink 18 enabling vehicles equipped with the radar device to transmit data to a remote server 3.

There is also provided a down link 28 enabling vehicles to receive data from a remote server 3.

With reference to FIG. 8, vehicles V61 and V62 transmit their information through uplink 18 to the remote server 3 (or as illustrated at FIG. 4 generally to one or more unit(s) in the cloud). Vehicles V61 and V62 also receive data about potholes via downlink 28 from server(s) or cloud service(s).

We note that even vehicles not equipped with radar sensing device like the truck referenced V63 at FIG. 8 can take advantage of the knowledge of potholes. V63 only displays second potholes, since it cannot detect themselves the potholes in real time.

With reference to FIG. 7, vehicles V4 V5 V6 V7 V8 V9 circulate on a network of road or tracks. Potholes 9 and damaged areas 99 are comprised in the common database shared between road users. This knowledge can be located in a single pothole database 80, or shared between several memory units.

In the illustrated example vehicles V5 and V8 scan road surface determine pothole and transmit relative data to the remote server.

All other vehicles can take advantage of the updated information at a short term timeline.

Figure 10:
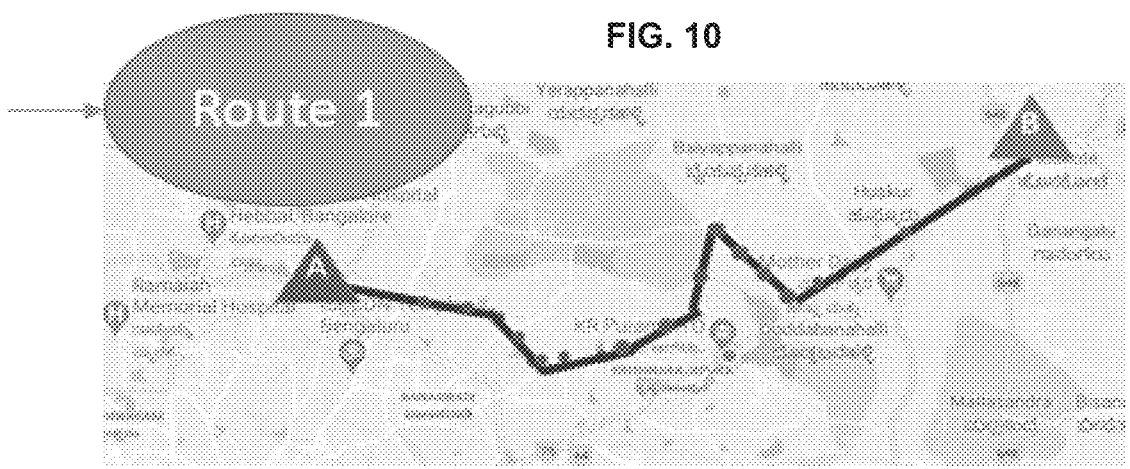
FIG. 10 illustrates a map/navigation display with different itinerary possibility associated with their potholes severity ratings.
Figure 10:
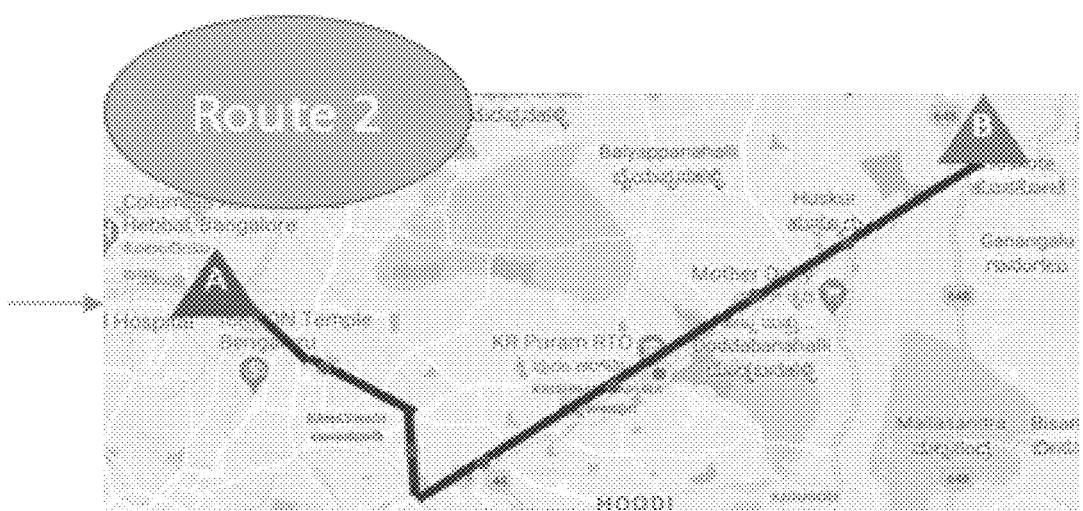

With reference to FIG. 10, there may be provided a navigation service helping a truck driver to choose the best itinerary when two or more options are possible.

In a manner very similar to a conventional navigation service, the navigation calculation can show various possible itineraries to go from a departure location denoted A to a destination location B. The display shows the various proposed itineraries to go from A to B, each itinerary being displayed together with a respective cumulated pothole severity rating. The location of outstanding pothole can be displayed with colors and icons.

Alternative route according to potholes ratings.

MISCELLANEOUS

It is preferred to display, on the cartography display, the potholes with various icons and/or colors, each of the first and second potholes together with their respective severity rating. This provides intuitive and comprehensive display for the truck drivers.

Also the first potholes can be shown differently with regard to second potholes. A first color or a first icon can be used to show first potholes whereas a second color or a second icon can be used to show second potholes.

When a pothole is no longer detected, it is not reported any longer. There is a fading process in the database which lead to delete a pothole that has been repaired. A pothole may disappear from the list in passive mode, i.e. no longer being reported. Alternatively, or in addition, a pothole may disappear from the list actively in response to notification of repair.

With the sensing device placed substantially at some height that say between 2 m and 3 m50, potholes can be detected by the lidar scan at a distance ahead from the track. The forward detection distance is at least 5 m from the truck front end. In some embodiments, the forward detection distance is at least 10 m from the truck front end. With such anticipation, the truck driver can efficiently avoid the more severe potholes, for example by a steering correction.

The invention claimed is:

1. A method for detecting, localizing, and reporting potholes on a road, wherein the method is carried out in a system comprising a sensing device mounted on a vehicle, a cartography display mounted on the vehicle, and an onboard control unit aboard the vehicle, the sensing device comprising at least a radar device, the method comprising:
   scanning, with the sensing device, an area of interest in front of and ahead of the vehicle, the area of interest including at least a surface of a road traveled by the vehicle, the sensing device outputting a data flow,
   identifying, in the data flow, first candidate potholes formed on the road surface, wherein candidate potholes correspond to predetermined echoes, wherein a pothole creates an echo different from an echo of an even road surface,
   further processing the data flow to find out first confirmed potholes among the first candidate potholes, by tracking the first candidate potholes following vehicle motion,
   allocating a geolocation to each of the first confirmed potholes, and
   displaying, on the cartography display, first confirmed potholes with their localization superimposed on a map, and one or more itineraries to go from a departure location to a destination location, each of the one or more itineraries being displayed with a cumulated pothole severity rating.

2. The method of claim 1, wherein the tracking of the first candidate potholes following vehicle motion is made via a SLAM (simultaneous localization and mapping) algorithm.

3. The method of claim 1, wherein the tracking of the first candidate potholes following vehicle motion is made via an ICP (Iterative Closest Point) algorithm.

4. The method of claim 1, wherein the radar device is an SAR-type radar, namely a synthetic aperture radar device.

5. The method of claim 1, wherein during the identifying, the first candidate potholes are extracted from the data flow, a likelihood of a confirmed pothole is assessed with subsequent radar scans, and such pothole is selected as a first confirmed pothole.

6. The method of claim 1, further comprising characterizing each of the first confirmed potholes by a set of size characteristics, comprising at least one of its depth, its width, and/or its length.

7. The method of claim 6, further comprising allocating a severity rating to each of the first confirmed potholes, possibly at least as a function of its depth.

8. The method of claim 1, further comprising sharing first confirmed potholes and associated geolocations, preferably with their size characteristics, to a third party, i.e., a remote server and/or Car2Car communication.

9. The method of claim 1, further comprising receiving second pothole data from a remote database or a local database.

10. The method of claim 9, further comprising displaying, on the cartography display, second potholes.

11. The method of claim 9, further comprising displaying, on the cartography display, with various icons and/or colors, each of the first and the second potholes together with a severity rating.

12. The method of claim 1, wherein the sensing device comprises, besides the radar device, a lidar device and/or a Time-of-Flight camera.

13. The method of claim 1, further comprising identifying in the data flow generally damaged and/or uneven portions on the road surface.

14. The method of claim 1, wherein the area of interest encompasses the whole width of the road/track.

15. A system comprising an imaging device mounted on a vehicle, a cartography display mounted on the vehicle, and an onboard control unit aboard the vehicle, configured to carry out the method of claim 1.

16. The system of claim 15, further comprising a remote server and a data link allowing data exchange between the remote server and the onboard control unit.

\* \* \* \* \*